Aug. 5, 1958 R. E. GUNTHER 2,846,028
MAGNETIC FLUID DAMPING DEVICE
Filed March 30, 1955
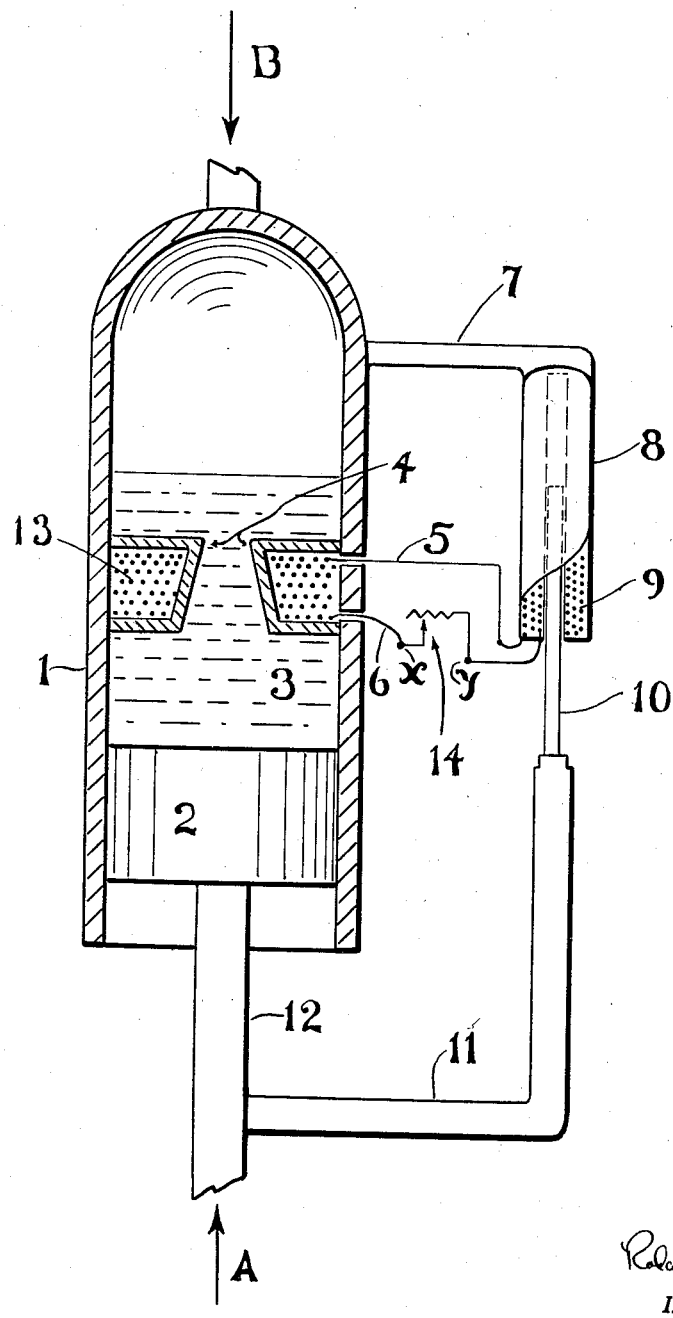
INVENTOR.
Roland Gunther

United States Patent Office 2,846,028
Patented Aug. 5, 1958

2,846,028

MAGNETIC FLUID DAMPING DEVICE

Roland Eric Gunther, Princeton Junction, N. J.

Application March 30, 1955, Serial No. 497,952

2 Claims. (Cl. 188—88)

This invention relates to motion damping devices, and specifically to automatically compensating motion damping devices for mechanical impulses of greatly varying force.

Friction type damping devices, and those which are called hydraulic shock absorbers are very common, and in many uses they serve well. However, there are some cases in which it is very important for the amount of motion that is permitted to result to be something less than proportional to the magnitude of the force which is the cause of the motion, and this type of regulation is usually difficult to obtain when random magnitudes are the rule.

This latter type of regulation is especially desirable in the case of automobile shock absorbers. An adjustment which yields a so-called soft ride may be well at moderate vehicle speeds, but this same adjustment in the control of relative motion between the wheels and the car body can result in disastrously poor control of the vehicle itself by the driver when sudden jolting influences are encountered at high speeds.

It is an object of this invention to provide a means of obtaining automatically increased damping control for mechanical motion resulting from impulses of varying force, when the said forces increase.

It is a further object of this invention to provide a means of obtaining this type of control even when ton sized magnitudes are involved.

It is also an object of this invention to provide a means of obtaining an automatically proportioned damping effect that may be easily and quickly varied by an operator in its degree.

These and other objects will become readily apparent in the accompanying drawing and the following specification.

The drawing shows a sectional view of a domed cylinder 1 and a side view of a piston 2 within said cylinder 1. Partially filling the space in cylinder 1 above the piston 2 is a portion of fluid 3. The fluid 3 is of a particular character, in that it contains a multitude of comminuted magnetizable particles, similar to that which is used in the recently introduced magnetic fluid clutches. Within the cylinder 1 and also shown in section is a constriction 4 and around the constriction 4 is an electrically conductive winding 13, the leads to which are indicated by the numbers 5 and 6. The leads 5 and 6 are shown coming out from within the cylinder 1. The lead 5 connects to a solenoid 9 shown in partial section within a small cylinder 8. The cylinder 8 is held rigidly parallel to cylinder 1 by an arm 7. Extending partially into the solenoid 9 in the view shown, and fully extendable thereinto is a plunger magnet 10. The plunger magnet 10 is rigidly held in line with the solenoid 9 by an arm 11 affixed to a piston rod 12 operating with the piston 2. The other lead 6 from the winding 13 around the constriction 4 is shown connected at a point indicated by the letter "x" to one side of a variable resistor 14. The lead 6 then continues from the other side of the variable resistor 14 from the point indicated by the letter "y" to the solenoid 9. In certain instances the variable resistor 14 may be omitted, and then that portion of the circuit will proceed directly from the point "x" to the point "y."

Also shown in the drawing are two arrows A and B to indicate the directions of the relative motion or motions for which damping action is to be effected.

The manner in which the device operates is as follows. When a movement in the direction of the arrow A or B or both A and B takes place the piston 2 moves into the cylider 1, thereby forcing some of the fluid 3 through the constriction 4. At the same time, since the plunger 10 is connected to the piston 2 and the rod 12 by the arm 11, and since the coil 9 is connected to the cylinder 1 by the arm 8 the same motion will cause the magnet plunger 10 to move within the coil 9 thereby inducing a current flow in the coil 9 and its associated circuit which includes the leads 5 and 6, the rheostat 14 and the winding 13 around the constriction 4. This current thus created within the circuit causes the winding 13 to build up a magnetic field in the vicinity of the constriction 4, and this field in turn magnetizes the paramagnetic particles in that portion of the fluid 3 in this same vicinity. Magnetization of the fluid component causes a decrease in the fluidity of the mass, or in other words the magnetization of the portion of the mass in the region of the constriction 4 causes an increase in resistance to expulsion of the fluid mass 3 through the constriction 4. The resistance thus created to oppose or damp the motion is a function of the strength of the magnetic field, which is proportional to the current, and the amount of current that flows is in turn determined by the motion between the magnet 10 and the coil 9, subject to adjustment of the rheostat 14. With any desired rheostat setting therefore a sudden and intense impressed motion causes an initially high current surge which yields a sharp damping action. Any moderate relative motion between the piston and the cylinder and their associated apparatus causes only a weak magnetic field to form and this results in a correspondingly mild damping action.

The rheostat 14 may conveniently be placed at a location a bit remote from the actual damping device proper for ease of adjustment in such cases as when the device is used in automobiles and different road conditions make a change in the degree of response in the device desirable. When the degree of control is to be essentially the same at all times the points "x" and "y" in the electrical circuit may be connected directly and the rheostat 14 omitted, or the rheostat may be replaced by a fixed resistor, connected between the points "x" and "y."

I claim:

1. In a motion damping device the combination of a cylindrical containing means, a fixed tubular constriction, said constriction being located in said containing means, the inner dimensions of diameter and length of said constriction being less than one third of the respective dimensions of said cylindrical containing means, an electrically conductive winding, said winding comprising an electromagnet in structure capable of producing a magnetic field when energised, said electrically conductive winding surrounding said tubular constriction, a piston, said piston movable with a sliding fit within said cylindrical containing means, a mass of movable discrete paramagnetic particles, said mass of paramagnetic particles contained within said containing means, said mass of paramagnetic particles capable of being forced through said tubular constriction by movement of said piston in said cylindrical containing means, a plunger type electrical generator, said generator having a plunger and a generator body, a mechanical linking means, said mechanical linking means capable of simultaneously impressing motion to be damped in linear fashion on said piston with respect to said containing means and on said plunger with respect to said generator body, and an electrical wiring circuit, said wiring circuit electrically connecting the output of said generator in series with said electrically conductive winding.

2. In a motion damping device the construction of claim 1, wherein said electrical wiring circuit includes also a series connected electrical resistance.

References Cited in the file of this patent

UNITED STATES PATENTS

| | | |
|---|---|---|
| 2,667,237 | Rabinow | Jan. 26, 1954 |
| 2,718,157 | Schaub | Sept. 20, 1955 |
| 2,720,819 | Ryan et al. | Oct. 18, 1955 |

FOREIGN PATENTS

| | | |
|---|---|---|
| 74,640 | Denmark | Sept 1, 1952 |
| 704,084 | Great Britain | Feb. 17, 1954 |